Figure 1:
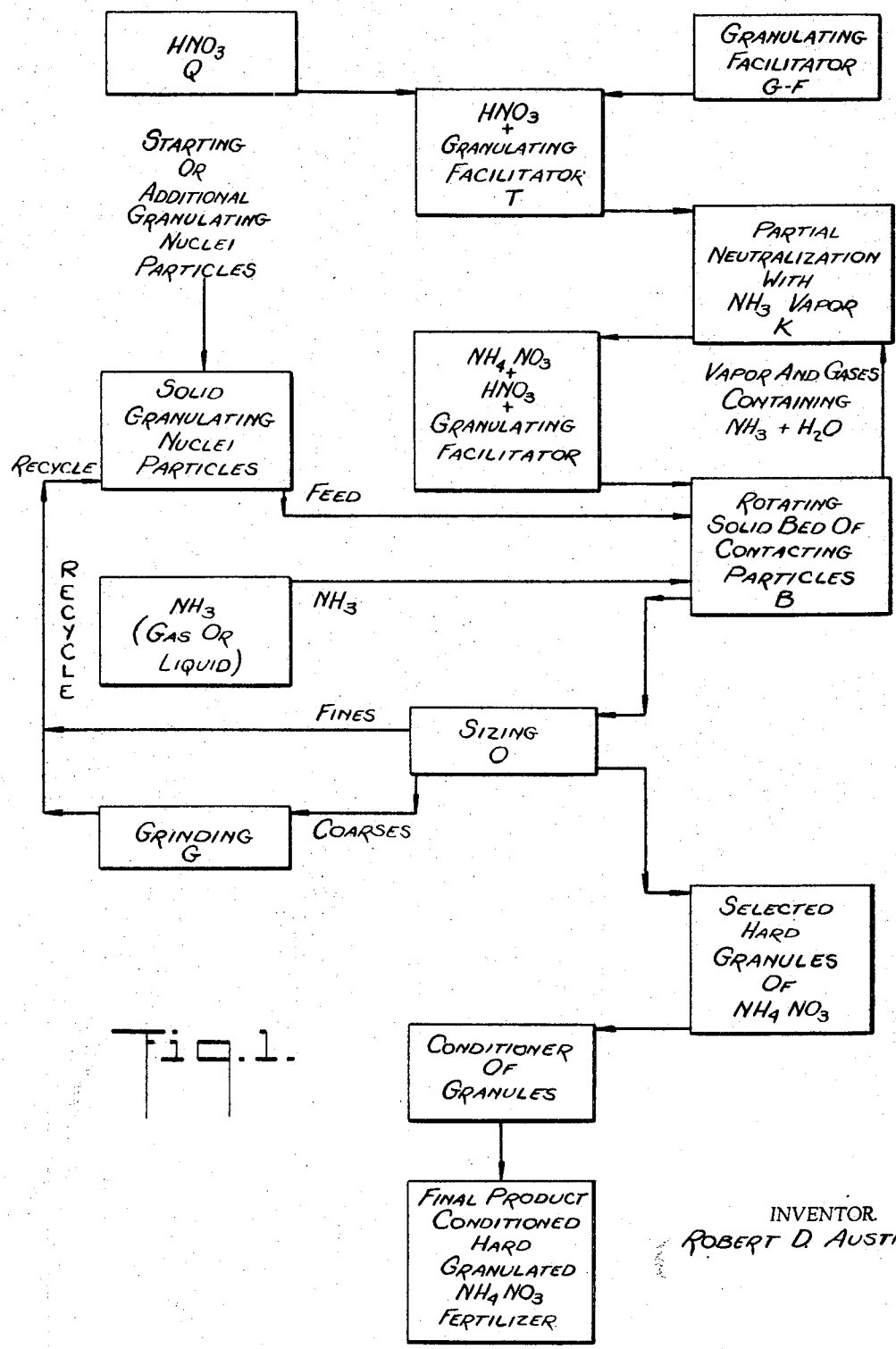

INVENTOR.
ROBERT D. AUSTIN

Aug. 10, 1965    R. D. AUSTIN    3,199,950
PROCESS OF PRODUCING HARD, GRANULATED AMMONIUM NITRATE
Filed July 27, 1962    2 Sheets-Sheet 2
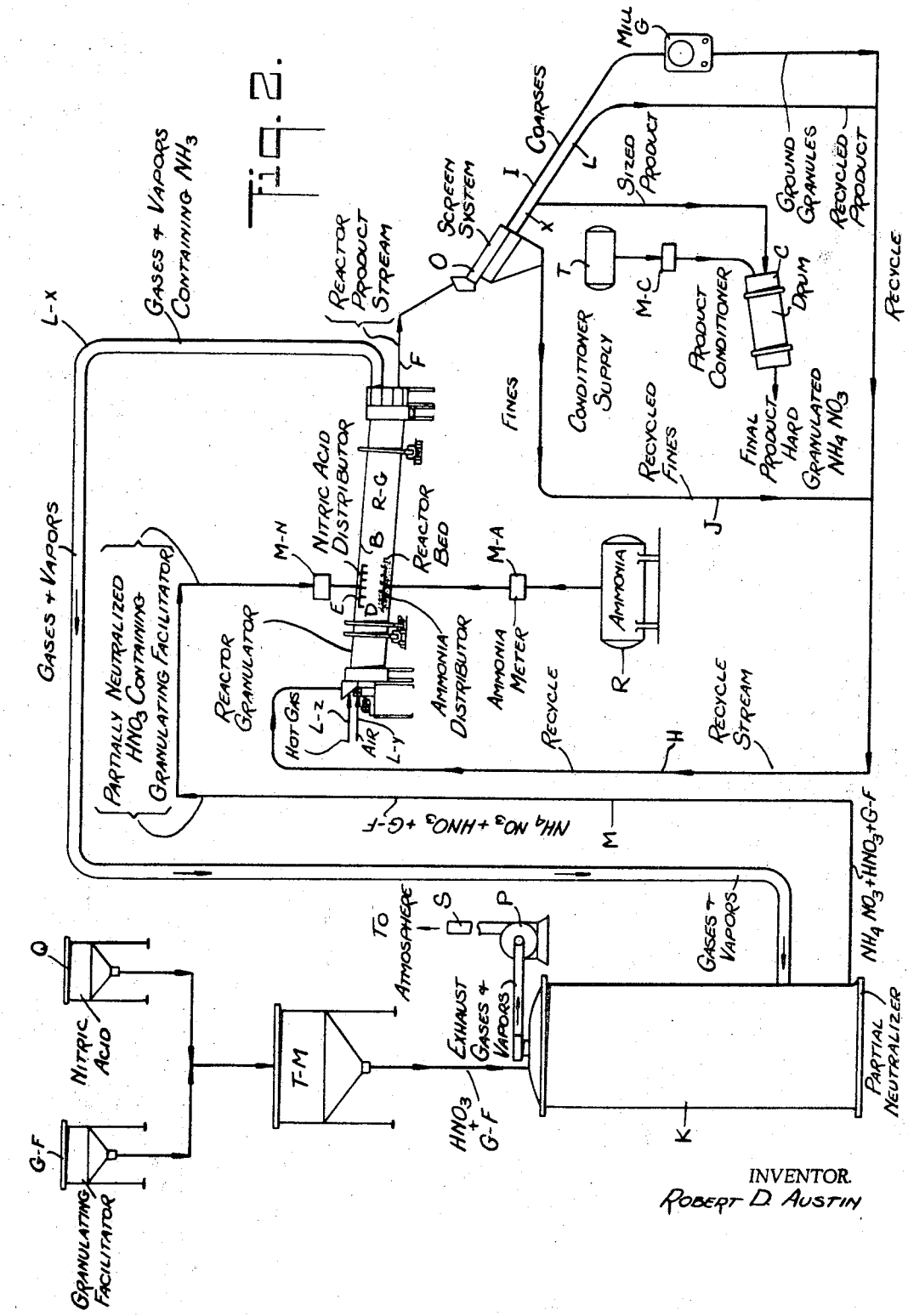
INVENTOR.
ROBERT D. AUSTIN

United States Patent Office 3,199,950
Patented Aug. 10, 1965

3,199,950
PROCESS OF PRODUCING HARD, GRANULATED
AMMONIUM NITRATE
Robert D. Austin, Tampa, Fla., assignor, by mesne assignments, to Tennessee Corporation, New York, N.Y., a corporation of Delaware
Filed July 27, 1962, Ser. No. 212,828
5 Claims. (Cl. 23—103)

The present invention relates to an improved process of producing hard, granulated ammonium nitrate, and, more particularly, to an improved continuous process of manufacturing hard, granulated ammonium nitrate fertilizer.

It is well known that ammonium nitrate is a hazardous material to manufacture on an industrial scale, to handle commercially in large amounts and to store in great masses in commercial warehouses and storage bins, especially for relatively long periods of time. As those skilled in the art have been aware, there have been unexplained accidents and explosions in the manufacture, handling and storage of ammonium nitrate. Various attempts have been made to formulate hypothetical explanations for these prior accidents and explosions, but no wholly satisfactory and acceptable theory has been postulated. The art has known that ammonium nitrate has existed in several states or phases which have caused difficulties in the manufacture, handling and/or storage of ammonium nitrate. As a result of the situation confronting the art, a variety of cumbersome and costly processes using elaborate installations of expensive equipment have been utilized. Among these prior processes for making pelletized, prilled and granulated ammonium nitrate, the more practical which might be mentioned are the Batch Process, the Fauser Process, the SBA Process, the Stengel Process, and the Crystallization Process.

In the Batch Process, there are essentially three main steps to produce dry ammonium nitrate. An acidulated heel of ammonium nitrate solution from a previous run forms a pool in a neutralizing tank of wood or acid-resistant steel. To this pool are added nitric acid of about 50% strength and ammonia (in gaseous or liquid form) simultaneously and in controlled amounts to effect neutralization. The operation must be carefully conducted to maintain a temperature below the boiling point and to use a slight excess of acid. When sufficient neutralized solution has been prepared, it is introduced in the required amount into large, open evaporating pans of suitable acid-resistant metal. These pans are heated by steam. The heating and resulting evaporation effects a concentration from about 50% strength to over 95% strength with respect to ammonium nitrate. During concentration development of acidity is prevented by the addition of small amounts of inorganic anti-acid material, such as chalk, zinc oxide, or the like. Throughout the operation, mechanical or compressed-air agitation is maintained. The end of the evaporation may be controlled by freezing-point determination of the concentration of the solution or by visual observation of crystallization at the cooled surface of a sample of the solution. The ammonium nitrate from the evaporating pans which contain only a small percentage of water is removed to a jacketed-graining kettle of suitable resistant metal. In the graining kettle, the final removal of water takes place during mechanical agitation, with the use of supplementary air, if desired. When prilling is desired, the hot concentrated solution (containing 95% ammonium nitrate) is pumped to the top of a cooling tower and sprayed down through the tower as droplets. On cooling such spraying produces a rounded particle or prill. The prills are further dried in a dryer. The Batch Process has many disadvantages including the failure to use all of the heat of neutralization, the necessity of utilizing a complicated procedure of evaporation and careful controls, and the requirement of a large investment for extensive and elaborate equipment.

The Fauser Process which is utilized considerably in foreign countries endeavors to employ the heat of neutralization. The neutralization of the aqueous nitric acid with gaseous ammonia is conducted in an enclosed chamber under super atmospheric pressure to prevent loss of reactants. Aqueous nitric acid and gaseous ammonia are introduced continuously in reacting proportions through separate inlets into a closed chamber containing a pool of neutralized liquor in which the reaction takes place with the continuous development of heat. This chamber is maintained under a pressure of several atmospheres which is considerably in excess of the vapor pressure of the ammonium nitrate solution. The reactants enter at the bottom of the chamber and, by means of a valve arrangement, hot ammonium nitrate solution is continuously discharged at the top into an outer vessel maintained at atmospheric pressure. The sensible heat of this solution and its contact with the inner vessel cause boiling and concentration of the neutralized solution. In this manner, a highly concentrated liquor can be produced and drawn off. The steam from the concentration in the outer vessel is utilized to preheat the reactants prior to neutralization. Graining or prilling and the final removal of water is then carried out. While the Fauser Process takes advantages of the heat of neutralization, the whole process including neutralization under pressure is rather complicated and involves the expense of drying and prilling. Moreover, the process requires considerable capital outlay and involves increased costs and complexity of operations.

The ammonium nitrate process used by Societe Belge l'Azote (known as the SBA Process) is similar to the Fauser Process. The neutralization takes place under pressure so as to utilize the heat of neutralization. This neutralization is accomplished either at atmospheric pressure or at a pressure of approximately four atmospheres depending on local conditions and economic requirements. The use of the pressure process affords the important advantages of being independent of external heat requirements. On the other hand, the use of atmospheric pressure affords lower capital cost and is recommended when the cost of steam is not an important factor. By the atmospheric process, gaseous ammonia and aqueous nitric acid are preheated separately in a heat exchanger which is heated by heat obtained by steam from the neutralizer. The preheated reactants then go to the neutralizer where ammonium nitrate (83% $NH_4NO_3$) is made. The 83% solution of ammonium nitrate is then concentrated to 95% ammonium nitrate. By the pressure process, neutralization is accomplished at about four atmospheres pressure. The ammonia gas and the nitric acid are introduced at a slightly higher pressure after being heated in exchangers using steam produced by the heat of neutralization. The hot solution of ammonium nitrate made in the neutralizer is fed to a vacuum concentrator where heating water is obtained by the heat of reaction. The vacuum produced by water ejection lowers the boiling point of the solution. The strength of the nitric acid used is around 50% to 54%. The ammonium nitrate solution is concentrated to a 95% solution and goes to storage after being preheated to prevent crystallization. Further processing is required to produce a granular or prilled product.

The Stengel Process reacts ammonia vapor with 58% nitric acid at a very high temperature (180° C. and above). The ammonia gas and the nitric acid are preheated in specially designed heat exchangers with the use of steam under pressure, say about 160 p.s.i. or so, and the heated reactants are fed continuously and simultaneously into the reactor. The reaction is exothermic and is very rapid. The heat of neutralization is sufficient to vaporize the water in the nitric acid feed. Hot molten ammonium nitrate and a trace of ammonia flow into a separator from the reactor. The centrifugal portion of the separator collects most of the molten ammonium nitrate and allows it to flow into an air stripper. The stripper air passes over the molten material on its way to the separator, reducing the moisture from say, about 2% to about 0.2%. The effluent air from the top of the separator is cooled and sent to a partial condenser to remove ammonium nitrate and water vapor which are then recycled back to the process. Molten ammonium nitrate from the separator enters a weir box which distributes it on an endless belt of stainless steel which is water-cooled. In other words, ammonium nitrate is produced in the liquid phase and is then solidified by cooling. Aluminum pans containing cooling water are located just under the top half of the steel belt so that the surface of the water is in contact with the underside of the belt. Solid ammonium nitrate is removed from the belt by a doctor blade. Such ammonium nitrate is then broken into pieces suitable to be fed by conveyor to grinders. The ground material is sized on a double-surface vibrating screen and the oversize is returned to the grinders. The fines are returned to the process. On-size material from the screen is fed to a drum where it is treated with a parting agent, such as diatomaceous earth. Although the Stengel Process is in commercial operation, the hazards in handling ammonium nitrate at the temperatures involved cannot be underestimated.

Ammonium nitrate is also made by the crystallization process. Ammonia is reacted with about 60% nitric acid in a circulating loop and the ammonium nitrate formed is dissolved in the recirculating mother liquor from the crystallizer. A vacuum crystallizer is used at low temperatures [such as about 160° F. (71° C.)] to avoid the possibility of hazard. The reaction provides enough heat to evaporate all the water introduced in the acid. Evaporation is divided between the crystallizer and the concentrator. Liquor containing the reaction product passes through a surge tank. Any slight amount of free acid in the liquor is neutralized and is then fed to the crystallizer as a warm unsaturated solution at about 125° F. (52° C.). In the crystallizer, this solution is cooled under vacuum to about 97° F. (36+ ° C.) to effect crystallization of the ammonium nitrate. The crystallized product is centrifuged, dried, and treated with a parting agent. The finished product contains about 33% nitrogen. Undersized crystals are retained in the process for further growth and the mother liquor is recycled to the ammonia absorber and then to the concentrator reactor to complete the cycle. Although attempts were made to overcome the foregoing difficulties and other disadvantages, none, as far as is known, was entirely successful when carried into practice commercially on an industrial scale for the manufacture, handling and storage of large amounts of ammonium nitrate.

It is an object of the present invention to provide an improved process for manufacturing a hard granulated ammonium nitrate which is free from hazards and which is capable of being carried into practice on an industrial scale in a relatively simple and economical manner.

Another object of the invention is to provide an improved process of producing a novel granulated ammonium nitrate which possesses greater hardness and more stability than products heretofore known to the art.

The invention also contemplates providing a novel process of making hard granulated ammonium nitrate possessing unique properties in a direct, one-stage operation.

It is a further object of the invention to provide an industrial process for manufacturing hard, stable ammonium nitrate which only requires relatively simple equipment and a plant having a low capital cost.

The invention further contemplates providing an improved process for manufacturing dry granulated ammonium nitrate on an industrial scale which involves a one-stage operation and which utilizes the heat of reaction for vaporizing water and drying moisture from the product.

It is also within the contemplation of the invention to provide an improved process for the production of hard, substantially uniform and spherical granules of ammonium nitrate which can be sized according to the needs of the trade.

Other objects and advantages will become apparent from the following description taken in conjunction with the accompanying drawings, in which:

FIGURE 1 is a flow sheet of a novel combination of operations which are effective to carry the present invention into practice; and FIGURE 2 depicts a schematic view of preferred equipment capable of carrying the invention into practice on an industrial scale for the production of commercially acceptable and stable products.

Broadly stated, the present invention contemplates a novel combination of operations and the use of a unique granulating facilitator in an improved process for the manufacture of hard, granulated ammonium nitrate, especially suitable for use as a fertilizer. By means of this novel combination of operations the heat of neutralization is utilized for vaporizing water without the need of employing super-atmospheric pressure or preheating the nitric acid and operating at high temperatures which tends to cause hazards, especially under commercial operating conditions. The present invention is depicted in a flow sheet illustrated in FIG. 1 and provides for the establishment in a reactor-granulator of a bed B of specially prepared granulated ammonium nitrate. The granulated material is preferably sized to about −8 mesh +60 mesh, and substantially −8 mesh +20 mesh (Standard Tyler screens). The bed B has a sufficient size and depth to furnish supply and carrying surface for nitric acid which contain a special granulating facilitator to effect granulation. The acid comes from a supply Q and the granulating facilitator from supply G–F. Both go to tank T containing the nitric acid with the granulating facilitator. The acid in aqueous solution is sprayed onto the bed which furnishes necessary and proper nuclei for granulation. The depth of the bed in the rotary reactor-granulator will vary with the diameter. For example, when the rotary reactor-granulator has a diameter of about three feet, the bed will be about 9" deep; and for a 12' diameter, the bed will be about 42" deep. Good results can be obtained with bed depths from about 9" and up. Having established the bed, nitric acid containing a granulating facilitator is sprayed on top of the mass of granules of ammonium nitrate. As the rotary reactor-granulator rotates the particles or granules are covered with films of nitric acid containing the granulating facilitator. Anhydrous ammonia is simultaneously introduced in the bed near the bottom via suitable means, such as a sparger, whereby instant neutralization takes place between the acid and ammonia to form granulated ammonium nitrate.

The nitric acid containing the granulating facilitator can be introduced by other means, but spraying is preferred. Granulation is accomplished by successive film build-up on the nuclei particles or granules with freshly made ammonium nitrate. The films of ammonium nitrate are immediately dried by the heat of reaction and are firmly bonded to the nuclei particles or granules.

The concentration of the nitric acid and control of the heat in the bed are important. The granules of the special granular ammonium nitrate do not soften or disintegrate at a temperature as high as 250° F. (121+ ° C.). The hardness of the granules is likewise not affected. The heat of the bed should be controlled from a minimum of about 212° F. (100° C.). The concentration of the nitric acid can be varied from about 52% to higher concentrations. However, commercial nitric acid (e.g. about 57%–58%) is preferred. Such acid will furnish, even after heat losses, sufficient heat of reaction to vaporize the water contained in the aqueous nitric acid. When such acid is used in connection with hot gas and/or cool air, the heat of the bed B can be controlled and the moisture in the ammonium nitrate leaving the reactor-granulator controlled to about 0.50% or under. Hot gas may not always be necessary.

The action of the rotary reactor-granulator gives the granulated particles or granules in the bed a forward rolling movement. Generaly speaking, the particles or granules travel in a helix-like path from the inlet to the outlet or discharge end of the reactor-granulator. The rolling movement rounds out the particles or granules. The product stream discharges from the reactor-granulator and goes to screen system O for sizing. Product sizes or selected granules are taken off to a bagging unit or storage. The fines coming from the screen system O are recycled back to the reactor-granulator together with the milled or ground coarses coming from the grinding system G. The recycle maintains the bed and furnishes nuclei particles or granules for further build-up of product sizes. The ratio of recycle to product withdrawn from the system will vary from about 1:1 to about 3:1 according to various factors including the concentration of nitric acid used.

The air introduced into the reactor-granulator at the inlet carries away steam, excess ammonia, and other gases and vapors to the partial neutralizer K where nitric acid used in the process is recirculated or fresh acid is added. The gases, aerosols and vapors, including ammonia and ammonium nitrate, escaping from the reactor-granulator are recovered and the ammonia partially neutralizes nitric acid to form ammonium nitrate. Eventually the effluent to the reactor-granulator will be a mixture of nitric acid and ammonium nitrate. A constant feed of nitric acid, which is metered according to production demands and in a stoichiometric quantity to produce ammonium nitrate, goes to the reactor-granulator. Likewise, a constant feed of partial neutralized effluent is fed to the sprays in the reactor-granulator where it is sprayed on the rotating bed of ammonium nitrate particles or granules. The partial neutralizer recovers ammonia that escapes through the reactor bed as well as any excess of ammonia. It is preferable to use some excess of ammonia going to the reactor-granulator to make up any ammonia which short circuits the reactor bed and to assure practically instantaneous and substantially complete neutralization of the nitric acid. Such excess of ammonia keeps down decomposition of the nitric acid to a minimum and also minimizes corrosion in the reactor-granulator. The amount or percentage of excess ammonia can be controlled by pH tests on the recirculating acid in the partial neutralizer. For further limitations on the corrosive aspect, the effluent from the partial neutralizer may be transferred to a separate tank and further neutralization effected and completed up to about 50% to about 75% before spraying the partially neutralized solution over the reactor bed. While an excess of ammonia is fed or supplied to the reactor-granulator, any excess not consumed therein is recovered in the partial neutralizer by acid and fed thereto and returned to the reactor bed.

After start-up, there are two feeds of ammonia for use in making the product. The theoretical amount or stoichiometric amount of ammonia to produce ammonium nitrate is preferably and accurately metered to the reactor. By so metering the ammonia in relation to the metered solution of partially neutralized nitric acid, an effective control is maintained over the process. When these reactants are fed to the reactor-granulator, several functions occur including (1) neutralization of nitric acid with ammonia to form ammonium nitrate; (2) granulation is effected by successive film build-ups around the nuclei granulated particles or granules; (3) water present in the solution containing nitric acid is released as steam by the heat of neutralization; (4) drying is substantially completely attained with the heat of neutralization which is supplemented by either hot or cold air introduced through the inlet of the reactor-granulator; and (5) the granulated particles or granules are rounded by the rotary action of the rotating reactor-granulator.

In carrying the invention into practice, it is preferred to utilize the equipment and operations illustrated in FIG. 2.

It will be observed that the reference character Q designates a tank containing a supply of nitric acid and that the reference character G–F designates a tank containing a granulating facilitator. Both the acid and the granulating facilitator feed into a mixing or dissolving tank T–M. The acid mixture or solution is fed to a partial neutralizer K which is preferably a spray tower with mist trap or a venturi type scrubber which absorbs the ammonia carried by a current of air coming from a reactor granulator R–G via line L–x. The current of air is supplied to the reactor-granulator via line L–y. To induce the current of air through the reactor granulator R–G, a fan or blower P is provided at the scrubber gas exit from tower K. Exhaust gases go to atmosphere from blower P via pipe S. Hot gas may be supplied to the reactor-granulator via line L–z.

Nitric acid containing the granulating facilitator coming from tower K goes via line M to an acid meter M–N and thence to the reactor-granulator via a distribution or spray system E. Anhydrous ammonia or liquid ammonia supply is designated by reference character R and is conveyed to an ammonia meter M–A and thence to an ammonia distributor or sparger D for distribution at the bottom or lower part of a bed of granulated ammonium nitrate B. As a general rule, stoichiometric proportions of acid and ammonia are metered to the process. The acid is metered to partial neutralizer K and thence to reactor-granulator R–G. The ammonia is metered directly to reactor-granulator R–G. In the reactor R–G, reaction takes place for the promotion of ammonium nitrate, granulation thereof, and drying of the granulated product.

In the bed in the reactor-granulator, the nitric acid is spread out and forms thin films of acid around the nuclei granular particles. Neutralization is effected and almost instant drying occurs from the heat of reaction. Thin coats of dry ammonium nitrate are successively bonded together around the nuclei granular particles to build up to granulated product sizes.

From the reactor-granulator, the final product is discharged at outlet F and goes to a set of screens O. After screening, granulated product is discharged via line X and is conducted to drum C where it is treated with a conditioner or parting agent, such as diatomaceous earth, supplied through feeder M–C and coming from conditioner supply T. A fraction or part of the discharged product may be recirculated via line L to join the recycle stream. Oversize product or coarses are taken off via line I and go to mill or grinding system G for grinding to appropriate sizes for recycle. Fines are returned via line J and join the recycle stream. The recycled fines, a portion or fraction of the product, if required, and ground coarses travel back via line H to the reactor-granulator for further build-up and to supply granulated nuclei to the bed in the reactor-granulator.

For construction of equipment for a plant, nitric-acid-resistant materials will be necessary for a great part of the equipment. Several types of stainless steel and other acid-resistant materials are suitable and available on the market.

To prepare the special granulated ammonium nitrate needed for starting the novel process, it is preferred to establish a bed of clean sand (−8 mesh to +14 mesh) Tyler Standard screens in a rotary reactor-granulator. Other inert and sized material can be used which will last long enough to give surface area and supply granular nuclei until enough special granulated ammonium nitrate is made. Prilled ammonium nitrate of granular character is effective to supply surface area and granular nuclei needed for producing hard, granulated ammonium nitrate, especially suitable as a fertilizer.

Nitric acid of suitable concentration and preferably containing a granulating facilitator in solution is sprayed on top of the rotating bed with the simultaneous diffusion of anhydrous ammonia via the sparger through the bed. The granular nuclei particles in the bed are coated with a thin film of nitric acid containing the granulating facilitator. The film of acid is immediately neutralized by the ammonia to make granulated ammonium nitrate. The heat of reaction immediately dries the film of ammonium nitrate bonding the dried film firmly to and around the granular particles of nuclei. Successive films of granulated ammonium nitrate are bonded together until the granular nuclei particles are built up to granulated product size. After a period of operation, substantially all of the inert nuclei material used for starting the bed is displaced and granulated ammonium nitrate with a small percentage of granulating facilitator is made in substantial quantity to furnish supply area for dispersing the nitric acid in thin films and to furnish adequate granular nuclei for building up to granulated product sizes. After the inert material has been displaced, granular fines and ground coarses are recycled back to the reactor-granulator. The granulating facilitator for effecting granulation must be added continuously.

For the purpose of giving those skilled in the art a better understanding of the invention and a better appreciation of the advantages of the invention, the following illustrative examples are given:

Example I

A cylinder constituting a reactor-granulator was set up on horizontal rollers as illustrated in FIG. 2 in order to provide rotating action. The reactor-granulator R–G was about 15″ in diameter and 15″ in length and rotated at about 26 r.p.m. It was found that stainless steel (type #316) functioned satisfactorily. A sparger was located in the lower part of the reactor-granulator for diffusing ammonia in the submerged part of the bed. A nitric acid distributor was located in the upper part of the reactor-granulator for distributing solutions containing nitric acid over the bed. Air-operated sprays were used for the distribution.

The bed in the rotary reactor-granulator was established with granulated di-ammonium phosphate of 18–46–0 (N-$P_2O_5$) variety. The reactor-granulator was rotated and solution containing nitric acid was sprayed on the bed with simultaneous introduction of anhydrous ammonia through the sparger submerged in the bed. During the operation it was observed that a hard dense white coating formed on the granulated particles of di-ammonium phosphate. A sample of material was taken from the bed and analyzed. The assay showed: moisture—4.67%, nitrogen—23.78%, and $P_2O_5$—32.91%. The analysis disclosed that the white hard surface coat on the di-ammonium granules was ammonium nitrate. In this manner, granulated ammonium nitrate can be made in a simple and economical manner by spraying nitric acid on a rotating bed of granulated product with the simultaneous introduction of anhydrous ammonia into the bed. It was discovered and certain tests proved that the granulation was due to the presence of the ($PO_4$) ion. The discovery revealed that a small or minor percentage of a granulating facilitator dissolved in the nitric acid or otherwise introduced caused ammonium nitrate to granulate. The granulating facilitator can be introduced by various means.

Example II

A second test was conducted with equipment illustrated in FIG. 2 in the same manner using granulated di-ammonium phosphate as an initial reactor bed. Nitric acid was sprayed via the distribution means E on the rotating bed in the reactor-granulator and simultaneously anhydrous ammonia gas was introduced through the ammonia distributor D, such as a sparger, into the reactor bed. A hard granular product was produced until too much of the di-ammonium phosphate was displaced and was no longer effective as granulating facilitator. The particles in the bed began to disintegrate and finally became powdery. The action proved that it is necessary to have a granulating-facilitator present during the formation of granulated ammonium nitrate.

Example III

Commercial prilled amonium nitrate obtained in the market was washed to remove any conventional parting agent and then dried. The dried prilled ammonium nitrate was used as the reactor bed in the cylindrical reactor-granulator. Nitric acid was sprayed on top of the rotating bed with the simultaneous introduction of anhydrous ammonia through the sparger into the lower part of the bed. It was found that the bed became wet and was composed of very large particles and fines which would not granulate. The very large particles were greater than about 6 mesh. Similarly, the fines were finer in size than about 20 mesh. The test demonstrated the need for a granulating facilitator during the formation of granulated ammonium nitrate.

Example IV

In another test, commercially prilled ammonium nitrate was used as a bed in the cylindrical reactor-granulator. Nitric acid was sprayed on top of the rotating bed with the simultaneous introduction of anhydrous ammonia through the sparger into and through the bed. The prilled amonium nitrate disintegrated into a fine powder. The test confirmed the discovery that without the use of a granulating facilitator the amonium nitrate disintegrates into a powder and fails to form into a hard granular product.

Example V

A further test was conducted to demonstrate that it was necessary to have a granulating facilitator present during the formation of ammonium nitrate in order to produce hard granules having stability for manufacture, handling, shipment, storage and use. A bed was made in the cylindrical reactor-granulator with fresh prilled ammonium nitrate. Nitric acid containing about 2% $P_2O_5$ constituting a granulating facilitator was obtained by the addition of 40% $P_2O_5$ wet process phosphoric acid to the nitric acid. The mixture of nitric acid and the granulating facilitator was sprayed on top of the rotating bed with the simultaneous introduction of anhydrous ammonia through the sparger into and through the bed. By continuing the operation, a granulated product, which is dry and free flowing, was produced. The novel results obtained by this test confirmed the discovery that ammonium nitrate can be granulated and hard granular ammonium nitrate can be produced provided a granulating facilitator is present during the formation of ammonium nitrate. It is preferred to dissolve it in nitric acid and to use a solution containing nitric acid and granulating facilitator.

Example VI

Another test was conducted to ascertain whether ammonium nitrate would granulate in a bed which was heated and which was free from a granulating facilitator. Prilled ammonium nitrate was used for a bed in the cylindrical reactor-granulator. Nitric acid (58%) was sprayed on top of the bed with simultaneous introduction of anhydrous ammonia through the sparger into and through the bed. External heat was supplied to the bed with hot gas to make up heat losses occurring within the reactor-granulator. After completion of the operations, it was found that the prilled ammonium nitrate disintegrated into a fine powder without the formation of any granular ammonium nitrate.

*Example VII*

A further test was conducted using quartz for a starting nuclei bed. A clean quartz type of sand was sized (−8 to +14) and was used as a starting bed in the cylindrical reactor. Nitric acid containing about 1% of C.P. 85% phosphoric acid was sprayed on the rotating bed with the simultaneous introduction of anhydrous ammonia through the sparger into and through the bed. The sand particles were coated with firm, hard coatings of granular ammonium nitrate. The test was continued with a recycle of the fines and ground coarses until the bed contained about 6% sand. The pellets produced were product size and ranged from about −7 mesh to about +14 mesh (Standard Tyler screens). The analysis of the pellets showed that they contained about 0.71% moisture, about 30.9% nitrogen, and about 6.3% sand. Carrying the test until all the sand was displaced would have shown that the final analysis would have been about 32.98% nitrogen. The ammonium nitrate was produced in granulated form. It was discovered that it was preferable to dissolve the granulating facilitator in the nitric acid and introduce it continuously as shown in the flow sheet illustrated in FIG. 1 and in the equipment flow sheet illustrated in FIG. 2.

*Example VIII*

The bed of the cylindrical reactor was filled with sand (−8 mesh to +14 mesh, Standard Tyler screens). Nitric acid had incorporated therein about 3.1% of phosphate rock (33.80% $P_2O_5$) which constituted a granulating facilitator and which was dissolved. The acid carrying the granulating facilitator was sprayed on top of the rotating bed with the simultaneous introduction of anhydrous ammonia through the sparger into and through the bed. Hard, firm coats of granulated ammonium nitrate built up, on, and around the sand particles. The test was continued until about 15% sand of the bed remained in the product sizes (−7 mesh to +14 mesh, Standard Tyler screens). During the test, fines and reground coarses were recycled and built up to product sizes. In the bed, the product sizes analyzed about 1.20% moisture, about 27.19% nitrogen, and about 15.45% sand. In the event that the test had been continued until all the sand was displaced, the product would contain about 32.16% nitrogen. In this test, sand functioned as the nuclei bed and phosphate rock as the granulating facilitator.

*Example IX*

The bed of the cylindrical reactor was filled with sand (−8 mesh to +14 mesh, Standard Tyler screens). Nitric acid containing about 0.10% of metallic iron dissolved in it as a granulating facilitator was sprayed on top of the rotating bed with the simultaneous introduction of anhydrous ammonia through the sparger into the bottom of the bed. Ammonium nitrate granulated around the sand particles formed hard pellets. The test was continued until the product sizes retained about 25% sand. The product from the bed analyzed about 0.13% moisture, about 25.92% nitrogen, and about 24.5% sand. By displacing all of the sand the product would have analyzed about 34.33% nitrogen. The sand furnished a nuclei starting bed and the iron functioned as a granulating facilitator.

*Example X*

The bed of the cylindrical reactor was filled with sand (−8 mesh to +14 mesh, Standard Type screens). Nitric acid containing about 0.10% of metallic copper dissolved in it as a granulating facilitator was sprayed on top of the rotating bed. Hard, firm coatings of granular ammonium nitrate were formed on the sand particles. The test was continued until about 42% sand was contained in the product sizes of the bed. The product from the bed analyzed about 0.35% moisture, about 19.92% nitrogen, and about 42.20% sand. If all of the sand had been displaced, the product would have analyzed about 34.46% nitrogen. Sand provided a nuclei bed and the copper performed the function of a granulating facilitator.

*Example XI*

The bed of the cylindrical reactor was filled with sand (−8 mesh to +14 mesh, Standard Tyler screens). Nitric acid containing in solution about 0.20% by weight of the commercial product known as "Nu-Manese" was sprayed on top of the rotating bed with the simultaneous introduction of anhydrous ammonia through the sparger for diffusion throughout the bed. Hard, firm coatings of granular ammonium nitrate formed around the sand particles. The test was continued until about 38% sand remained in the product sizes. The product from the bed analyzed about 0.29% moisture, about 21.63% nitrogen, and about 37.64% sand. In the event all of the sand had been displaced, the product would have contained about 34.52% nitrogen. "Nu-Manese" comprises a commercial form of manganese dioxide used for agricultural purposes and functioned as a granulating facilitator. The sand supplied nuclei for a starting bed.

*Example XII*

The bed of the cylindrical reactor was filled with broken glass (−8 mesh to +14 mesh, Standard Tyler screens). 40% $P_2O_5$ wet process phosphoric acid was mixed with the nitric acid to the extent of 5% by weight of the nitric acid. The solution of nitric acid containing a granulating facilitator was sprayed on top of the rotating bed with the simultaneous diffusion of anhydrous ammonia via a sparger through the bed. Hard coatings of granular ammonium nitrate formed on the particles of glass. The test was continued until the product sizes in the bed contained about 16% glass. The product from the bed analyzed about 0.69% moisture, about 27.93% nitrogen, about 2.89% $P_2O_5$, and about 16.27% glass. Had all of the glass been displaced, the product would have contained about 33.36% nitrogen and about 3.45% $P_2O_5$. In this test, the fines were not recycled and the glass was displaced from the bed by continuous production of ammonium nitrate. The fines in the bed resembled small rounded shot, about bird-shot size, but passed a 14 mesh Tyler screen. These fines were analyzed and assayed: 1.20% moisture, about 32.79% nitrogen, about 0.71% $P_2O_5$, and about 0.87% glass. It was observed that the fines were granular in character.

The test was continued for an extended period of time and the granulation of ammonium nitrate was good. Product sizes from the bed analyzed: about 0.33% moisture, about 31.69% nitrogen, about 2.76% $P_2O_5$, and about 3.55% glass. During the test the temperature in the bed was raised to about 240° F. (112° C.) for several hours and practically no deleterious effect could be observed on the granulates or on the hardness. Had all the glass been displaced, the product would have assayed: about 32.86% nitrogen and about 2.24% $P_2O_5$.

*Example XIII*

The bed having the final analysis in the foregoing example of 0.33% moisture, 31.69% nitrogen, 2.76% $P_2O_5$, and 3.55% glass was allowed to remain in the cylindrical reactor. About 1% potassium by weight as $KNO_3$ was dissolved in nitric acid, such acid was sprayed on top of the rotating bed with the simultaneous diffusion of anhydrous ammonia via the sparger through the bed. The test was continued until only 0.55% glass remained in the product sizes in the bed. The granulation of the ammonium nitrate was good. The product analyzed about 0.43% moisture, about 33.75% nitrogen, about 0.30% $P_2O_5$, about 1.89% $K_2O$, and 0.55% glass. The glass supplied a nuclei starting bed and the $KNO_3$ functioned as a granulating facilitator.

Example XIV

The cylindrical reactor bed was filled with sand (—8 mesh to +14 mesh). Nitric acid containing about 1% potassium as KNO₃ was sprayed on top of the rotating bed. The ammonium nitrate was granulated effectively and the test was continued until the product sizes contained about 12% sand. The product analyzed about 0.47% moisture, about 29.66% nitrogen, about 1.68% K₂O, and about 11.96% sand. Had all of the sand been displaced, the product would have assayed about 33.69% nitrogen and about 1.91% K₂O. The sand supplied a nuclei starting bed and the KNO₃ performed the function as a granulating facilitator.

The various tests confirm the discovery that ammonium nitrate will granulate in a hot bed used in the novel process provided a granulating facilitator is present during the reaction and formation of the ammonium nitrate. The granulating facilitator can be added to the nitric acid or can be added to the bed to effect granulation. This granulating facilitator can be in itself a primary plant food, such as a phosphoric acid or a phosphate salt, potassium hydroxide or potash salts, or it can be a micronutrient plant food, such as salt of iron, manganese, copper, etc.; or it can simply be a compound added to facilitate and effect granulation. While the granulating facilitators specifically mentioned in the illustrative examples have been found to be very effective, nevertheless the invention is not to be confined or limited to these specific materials. Any material which performs the function of causing ammonium nitrate to granulate in a hot bed is to be embraced within the purview of the invention. Such materials include the following: boric acid, potassium nitrate, hydrochloric acid, molybdenum tri-oxide, zinc, calcium hydroxide, silver nitrate, activated carbon, mercury, magnesium, chromium nitrate, nickel, cobalt, lanthanum, precipitated silica, alpha naphthalene, sodium sulfonate, and uranyl nitrate.

Ammonium nitrate occurs in several different modifications with various transition temperatures at which the changes in the crystal structure take place. For instance, the crystal structures include the cubic (169.6° C.–125.2° C.), the tetragonal (125.2° C.–84.2° C.), the rhombic (84.2° C.–32.1° C.), the rhombic (32.1° C.––18° C.), and the tetragonal (below —18° C.). There may be the possibility that these different modifications with various transition temperatures offer an explanation of why ammonium nitrate disintegrates in a hot bed.

It is to be noted that it has also been discovered that an ammonium nitrate powder can be produced. When the nitric acid is practically free from or substantially devoid of a granulating facilitator and when the operations are conducted as described herein, a fine powdered ammonium nitrate is produced. It was found that when nitric acid and ammonia reacted in the absence of a granulating facilitator, ammonium nitrate powder was made. The ammonium nitrate powder is distinct and different from any known ammonium nitrate or any commercial product on the market.

Unlike the prior art wherein neutralization and granulation are accomplished in separate steps, it is to be observed that the present invention provides a simple one-step procedure in which both operations are accomplished simultaneously. Furthermore, the invention provides utilization of the heat of neutralization to evaporate the water and to produce ammonium nitrate in a new and novel process. The new process avoids the objectionable features in the prior art, such as expensive pressure vessels in the Fauser Process or the necessity of operation at high temperatures in the Stengel Process. Moreover, the present process produces hard, uniform, spherical granules of ammonium nitrate which can be sized to the needs of the trade. By selecting an appropriate granulating facilitator, the particle size and/or hardness may be varied and by a suitable selection these properties may be controlled in a general manner.

Although the present invention has been described in conjunction with the preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An improved industrial process for manufacturing rounded, hard, stable ammonium nitrate in a direct, one-stage operation which only requires relatively simple equipment and a plant having a low capital cost which comprises establishing an elongated rolling bed for contacting particles of hard, granulated ammonium nitrate having an inlet at one end and an outlet at the opposite end; spraying nitric acid having a concentration of about 52% to about 58% over particles in a part of said bed adjacent to the inlet to cover surfaces of contacting particles; diffusing ammonia vapor from a bottom region of said elongated, rolling bed underneath said sprayed particles to enter into a reaction with nitric acid on said covered surfaces to form hard, granulated ammonium nitrate; controlling said diffused ammonia vapor to an amount in excess of that required by stoichiometric proportions to react with nitric acid present on said covered surfaces; conducting said reaction in the presence of a granulating facilitator capable of facilitating and effecting the granulation of said hard granulated ammonium nitrate, said granulating facilitator comprising an agent selected from the group consisting of boric acid, hydrochloric acid, and phosphoric acid; controlling the temperature in said elongated bed from about 212° F. to about 250° F. to maintain a hot bed capable of vaporizing vapors and gases including water vapor and unused excess ammonia; conducting hot gas from said inlet over the top of said elongated, rolling bed to said outlet to remove vapors and gases containing water vapor and unused, excess ammonia; passing said removed vapors and gases containing water vapor and unused, excess ammonia in contact with nitric acid to form partially neutralized nitric acid in an aqueous solution for use in the aforesaid spraying operation; continuing rotation of said elongated bed to roll particles over and over to round the same and to move them from said inlet to said outlet whereby the heat of reaction is utilized for vaporizing water and drying said granulated nitrate without employing super-atmospheric pressure, preheating nitric acid, and operating at high temperatures which tend to cause hazards, especially under industrial operating conditions for the production of commercial product and whereby rounded, hard, granulated ammonium nitrate is produced in a direct, one-stage operation; withdrawing a portion of rounded, hard, granulated ammonium nitrate being discharged from said outlet as finished product; and recycling the remainder to said elongated, rolling bed and through the aforesaid operations.

2. An improved process for manufacturing a hard, granulated ammonium nitrate which is free from hazards and which is capable of being carried into practice on an industrial scale in a relatively simple and economical manner which comprises partially neutralizing nitric acid in an aqueous solution with vapors and gases containing ammonia from a subsequent operation in the process; introducing more ammonia into said aqueous solution containing partially neutralized nitric acid to control the strength of the acid to a concentration of about 52% to about 58%; distributing said partially neutralized nitric acid over the top of a part of a rolling, elongated bed of contacting particles of hard, granulated ammonium nitrate to cover surfaces thereof; diffusing ammonia through said particles to contact said nitric acid covered surfaces and to enter into a reaction with said nitric acid to form hard, granulated ammonium nitrate; using an excess of ammonia in said diffusing step over that theoretically required to react with nitric acid on said covered surfaces; conducting said reaction in the presence of a granulating facilitator capable of facilitating and effecting the granulation of said hard, granulated ammonium nitrate, said granulating facilitator comprising an agent selected from the group consisting of chromium nitrate, potassium nitrate, silver nitrate, uranyl nitrate, and diammonium phosphate; controlling the temperature in said elongated bed from about 212° F. to about 250° F. to maintain a hot bed capable of vaporizing vapors and gases including water vapor and unused, excess ammonia; conducting vapors and gases including water vapor and said unused, excess ammonia evolved from the reaction of nitric acid and ammonia to the aforesaid partially neutralizing operation and using said unused, excess ammonia to partially neutralize nitric acid in an aqueous solution; and continuing rotation of said elongated bed to roll particles over and over to round the same and to move them from said inlet to said outlet whereby the heat of reaction is utilized for vaporizing water and drying said granulated nitrate without employing superatmospheric pressure, preheating nitric acid, and operating at high temperatures which tend to cause hazards, especially under industrial operating conditions for the production of commercial product and whereby rounded, hard, granulated ammonium nitrate is produced in a direct, one-stage operation.

3. An improved process for manufacturing dry, rounded, hard, granulated ammonium nitrate on an industrial scale which involves a direct one-stage operation and which utilizes the heat of reaction in the formation of ammonium nitrate for vaporizing water and for drying moisture from the formed nitrate which comprises establishing an elongated, rolling bed of contacting particles of hard, granulated ammonium nitrate having an inlet at one end and an outlet at the opposite end; distributing an aqueous solution containing nitric acid having a concentration of about 52% to about 58% over surfaces of particles within a portion of said bed; dispersing ammonia in excess of stoichiometric proportions within said portion of said bed to enter into a reaction with nitric acid in the presence of a granulating facilitator effective to form hard, granulated ammonium nitrate, said granulating facilitator comprising a metallic element selected from the group consisting of calcium, chromium, cobalt, copper, iron, lanthanum, magnesium, manganese, mercury, molybdenum, nickel, potassium, silver, uranium, and zinc; controlling the temperature in said elongated bed from about 212° F. to about 250° F. to maintain a hot bed capable of vaporizing vapors and gases including water vapor and unused, excess ammonia; removing unused, excess ammonia and neutralizing nitric acid with said ammonia to produce an aqueous solution containing partially neutralized nitric acid for use in the said distributing operation; rolling said particles forward in said elongated bed from the inlet to the outlet in a helix-like path to cause rounding of hard, granulated ammonium nitrate; and continuing rolling said particles over and over to round the same and to move them from said inlet to said outlet whereby the heat of reaction is utilized for vaporizing water and drying said granulated nitrate without employing super-atmospheric pressure, preheating nitric acid, and operating at high temperatures which tend to cause hazards, especially under industrial operating conditions for the production of a hard, granular commercial product.

4. An improved industrial process of making rounded, hard, granulated ammonium nitrate possessing unique properties in a direct, one-stage operation which comprises establishing an elongated rolling bed of contacting particles of hard, granulated ammonium nitrate having an inlet at one end and an outlet at the opposite end; spraying nitric acid having a concentration of about 52% to about 58% and containing a granulating facilitator effective to granulate ammonium nitrate over a part of said bed adjacent to the inlet to cover the surfaces of contacting particles, said granulating facilitator comprising an agent selected from the group consisting of alpha naphthalene and sodium sulfonate; diffusing ammonia vapor in at least stoichiometric proportions from a bottom region of said elongated rolling bed underneath said sprayed particles to enter into a reaction with nitric acid on said covered surfaces in the presence of said granulating facilitator to form hard, granulated ammonium nitrate; controlling the temperature in said elongated bed from about 212° F. to about 250° F. to maintain a hot bed capable of vaporizing vapors and gases including water vapor and unused ammonia; rolling said particles over and over and moving them from the inlet to the outlet whereby hard, granulated ammonium nitrate is produced in a direct, one-stage operation; and continuing rolling said elongated bed to roll particles over and over to round the same and to move them from said inlet to said outlet whereby the heat of reaction is utilized for vaporizing water and drying said granulated nitrate without employing super-atmospheric pressure, preheating nitric acid, and operating at high temperatures which tend to cause hazards, especially under industrial operating conditions for the production of commercial product and whereby rounded, hard, granulated ammonium nitrate is produced in a direct, one-stage operation.

5. An improved industrial process of making rounded, hard, granulated ammonium nitrate possessing unique properties in a direct, one-stage operation which comprises establishing an elongated rolling bed of contacting particles of hard, granulated ammonium nitrate having an inlet at one end and an outlet at the opposite end; spraying nitric acid having a concentration of about 52% to about 58% and containing a granulating facilitator effective to granulate ammonium nitrate over a part of said bed adjacent to the inlet to cover the surfaces of contacting particles, said granulating facilitator comprising an agent selected from the group consisting of calcium hydroxide, manganese dioxide, molybdenum trioxide, and potassium hydroxide; diffusing ammonia vapor in at least stoichiometric proportions from a bottom region of said elongated rolling bed underneath said sprayed particles to enter into a reaction with nitric acid on said covered surfaces in the presence of said granulating facilitator to form hard, granulated ammonium nitrate; controlling the temperature in said elongated bed from about 212° F. to about 250° F. to maintain a hot bed capable of vaporizing vapors and gases including water vapor and unused ammonia; rolling said particles over and over and moving them from the inlet to the outlet whereby hard, granulated ammonium nitrate is produced in a direct, one-stage operation; and continuing rolling said particles over and over to round the same and to move them from said inlet to said outlet whereby the heat of reaction is utilized for vaporizing water and drying said granulated nitrate without employing super-atmospheric pressure, preheating nitric acid, and operating at high temperatures which tend to cause hazards, especially under industrial operating conditions for the production of commercial product and whereby rounded, hard, granulated ammonium nitrate is produced in a direct, one-stage operation.

References Cited by the Examiner

UNITED STATES PATENTS

| | | | |
|---|---|---|---|
| 2,600,253 | 6/52 | Lutz | 23—103 |
| 2,902,342 | 9/59 | Kerley | 23—103 |
| 2,963,359 | 12/60 | Moore et al. | 71—64 |
| 2,965,471 | 12/60 | Stassfort | 71—64 |
| 3,037,855 | 6/62 | Smith | 23—103 |

DONALL H. SYLVESTER, *Primary Examiner.*

ANTHONY SCIAMANNA, *Examiner.*